United States Patent
Stockton et al.

(10) Patent No.: US 11,647,827 B2
(45) Date of Patent: May 16, 2023

(54) SUPPORT POLE SYSTEM FOR SUPPORTING ARTICLES

(71) Applicant: High & Dry LLC, Cedar Hill, TX (US)

(72) Inventors: Jordan Stockton, Cedar Hill, TX (US); Jason Wallace, Huntsville, TX (US)

(73) Assignee: High & Dry LLC, North Richland Hills, TX (US)

( * ) Notice: Subject to any disclaimer, the term of this patent is extended or adjusted under 35 U.S.C. 154(b) by 0 days.

(21) Appl. No.: 17/527,481

(22) Filed: Nov. 16, 2021

(65) Prior Publication Data

US 2022/0071378 A1 Mar. 10, 2022

Related U.S. Application Data

(63) Continuation of application No. 17/015,389, filed on Sep. 9, 2020, now Pat. No. 11,178,959.

(51) Int. Cl.
*F16M 11/00* (2006.01)
*F16M 13/02* (2006.01)
(Continued)

(52) U.S. Cl.
CPC .............. *A45F 3/44* (2013.01); *F16M 11/28* (2013.01); *A01K 97/10* (2013.01); *A01M 31/06* (2013.01);
(Continued)

(58) Field of Classification Search
CPC ....... A45F 3/44; A45F 2200/05; F16M 11/28; F16M 2200/08; A01K 97/10; A01M 31/06; G09F 7/18; E02D 5/80
See application file for complete search history.

(56) References Cited

U.S. PATENT DOCUMENTS

| | | | | |
|---|---|---|---|---|
| 3,076,557 A | * | 2/1963 | Husted | A47J 37/0763 |
| | | | | 248/156 |
| 3,285,554 A | * | 11/1966 | Voelkerdingfrankj | E01F 9/685 |
| | | | | 248/156 |
| 3,623,685 A | | 11/1971 | Thomson | |
| 4,249,715 A | * | 2/1981 | Repp | E04H 12/2215 |
| | | | | 248/156 |
| 4,327,514 A | | 5/1982 | Bourque | |

(Continued)

FOREIGN PATENT DOCUMENTS

CN 206093959 U 4/2017

OTHER PUBLICATIONS

Quack Rack, QR Pack Pole, https://quackrack.com/product/qr-pack-pole/. Accessed Sep. 4, 2020, pp. 1-10.

*Primary Examiner* — Tan Le
(74) *Attorney, Agent, or Firm* — Grady K. Bergen; Griggs Bergen LLP

(57) ABSTRACT

A support pole system for supporting articles above the ground or earth includes a support pole formed from at least two elongated pole sections that are movably coupled together so that the pole sections can be moved relative to one another between collapsed and extended positions to shorten and lengthen the support pole. An article head piece is coupled to an upper end of the support pole for attaching articles to the support pole. A base assembly couples to the lower end of the support pole and has a stake configured for insertion into the ground or earth for supporting the support pole in an upright position. The stake has projecting members that engage the ground or earth when the stake is inserted therein to prevent rotation of the stake about the longitudinal axis of the stake. A cross member is positioned at an upper end of the stake to form a footrest to facilitate insertion of the stake into the ground or earth.

20 Claims, 10 Drawing Sheets

(51) Int. Cl.
*A45F 3/44* (2006.01)
*F16M 11/28* (2006.01)
*G09F 7/18* (2006.01)
*A01M 31/00* (2006.01)
*A01K 97/00* (2006.01)
*A01M 31/06* (2006.01)
*A01K 97/10* (2006.01)
*E02D 5/80* (2006.01)

(52) U.S. Cl.
CPC ............ *A45F 2200/05* (2013.01); *E02D 5/80* (2013.01); *F16M 2200/08* (2013.01); *G09F 7/18* (2013.01)

(56) References Cited

U.S. PATENT DOCUMENTS

| | | | | |
|---|---|---|---|---|
| 4,662,305 | A | * | 5/1987 | Cline ...................... G09F 17/00 |
| | | | | 116/173 |
| 4,923,164 | A | * | 5/1990 | Stenberg ............. E04H 12/2215 |
| | | | | 52/165 |
| 5,058,308 | A | | 10/1991 | Girard |
| 7,980,520 | B2 | | 7/2011 | Taylor |
| 9,010,013 | B2 | | 4/2015 | Smith |
| 9,663,191 | B2 | | 5/2017 | Cromartie |
| 10,729,226 | B1 | * | 8/2020 | Zamora ...................... A45F 3/44 |
| 11,178,959 | B1 | * | 11/2021 | Stockton ................ F16M 11/28 |
| 2009/0065662 | A1 | * | 3/2009 | Taylor ...................... A45F 3/44 |
| | | | | 248/156 |
| 2011/0277382 | A1 | | 11/2011 | Davis |

* cited by examiner

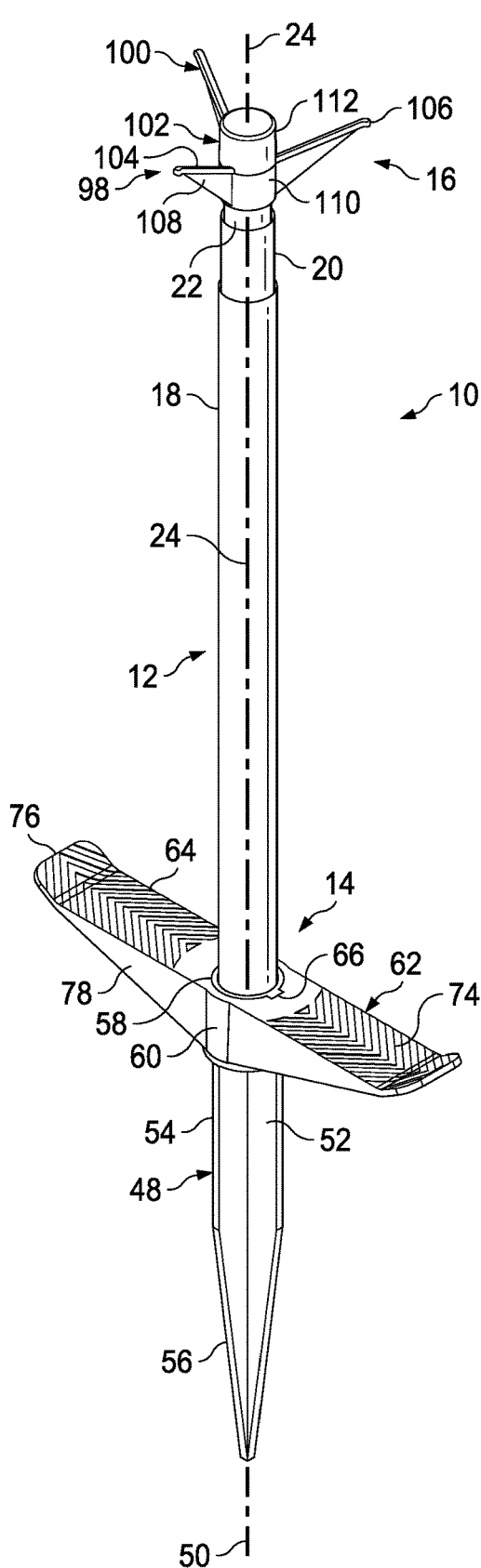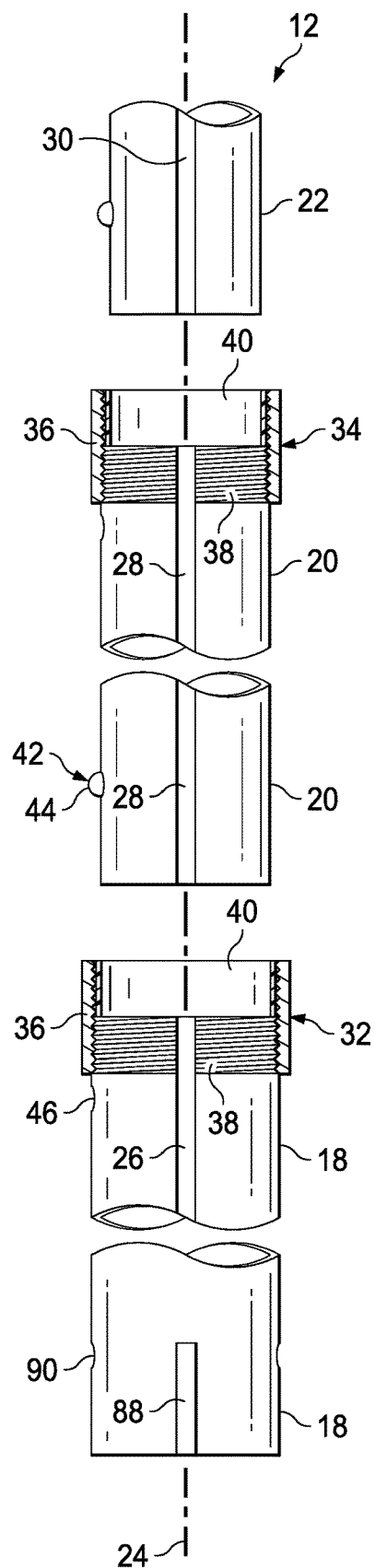
FIG. 1
FIG. 2

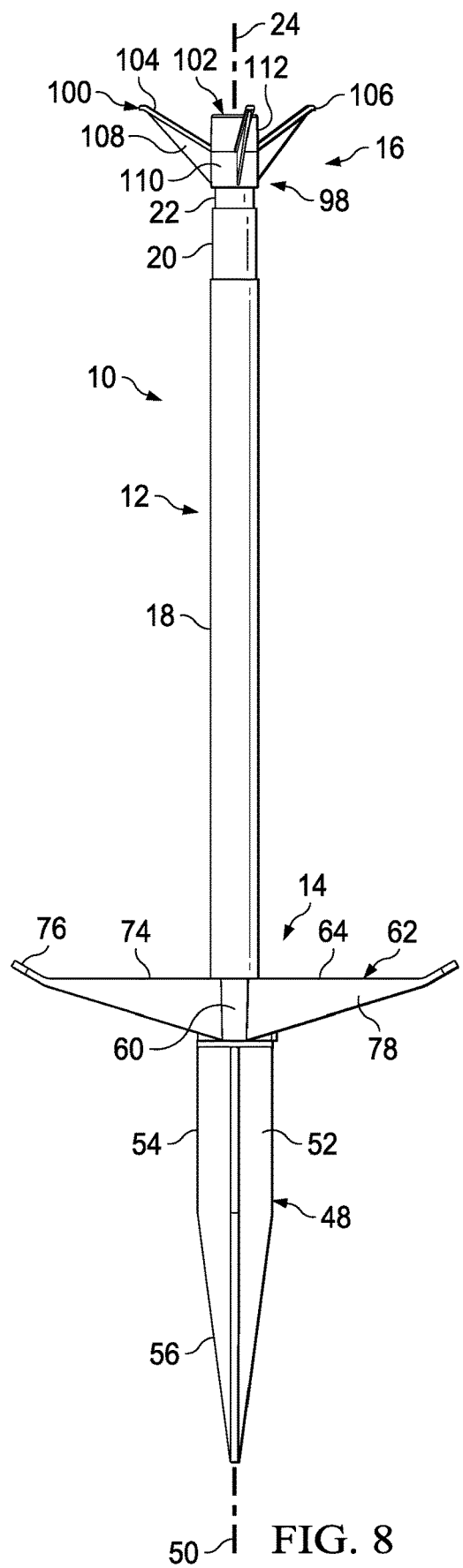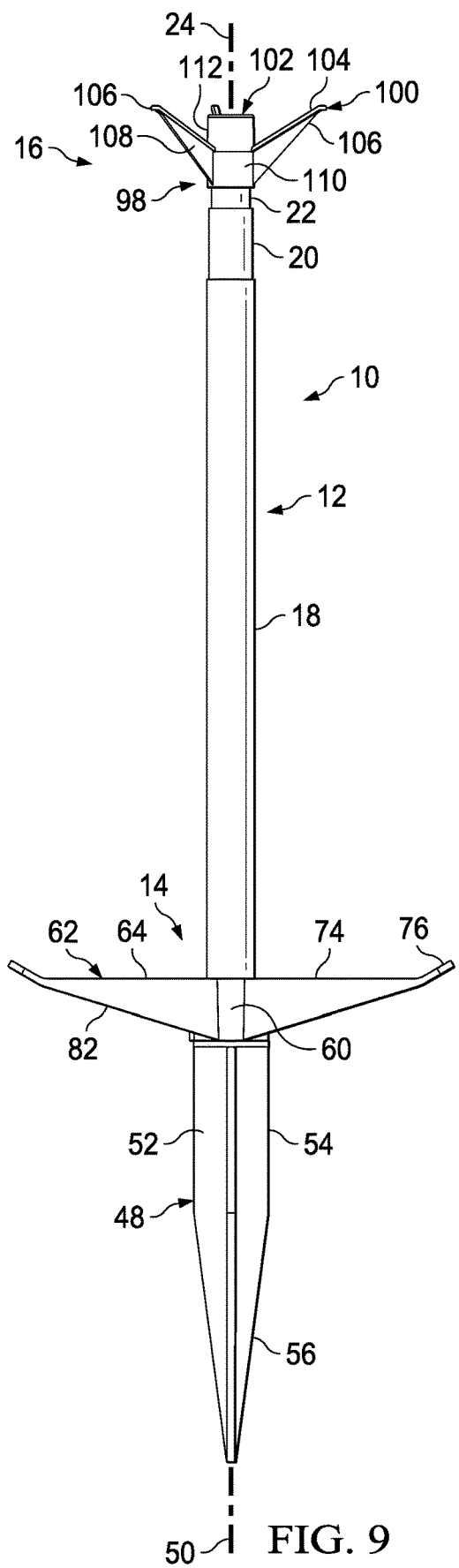

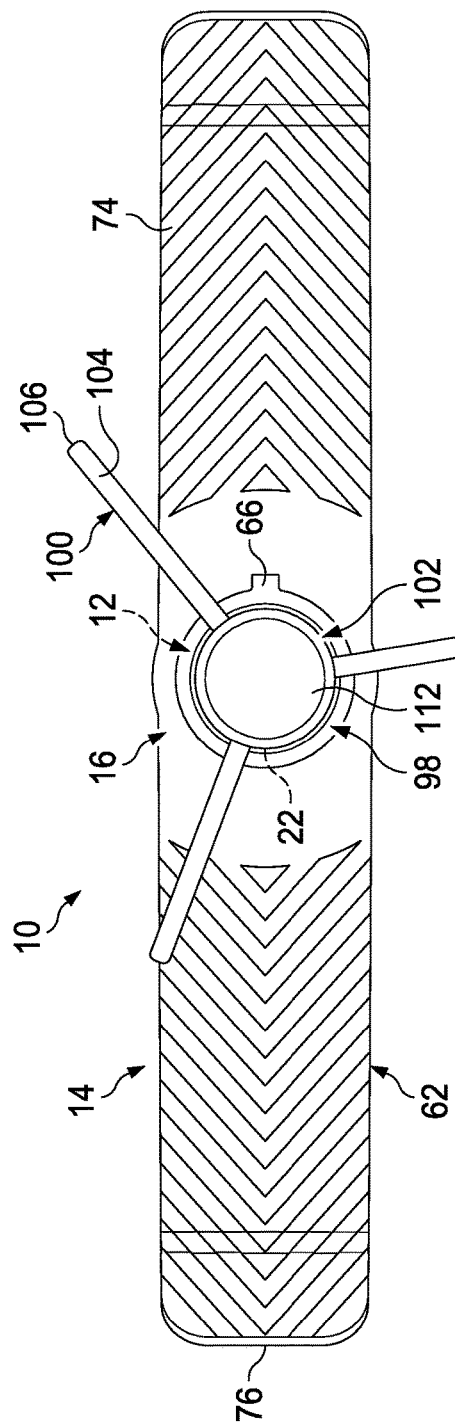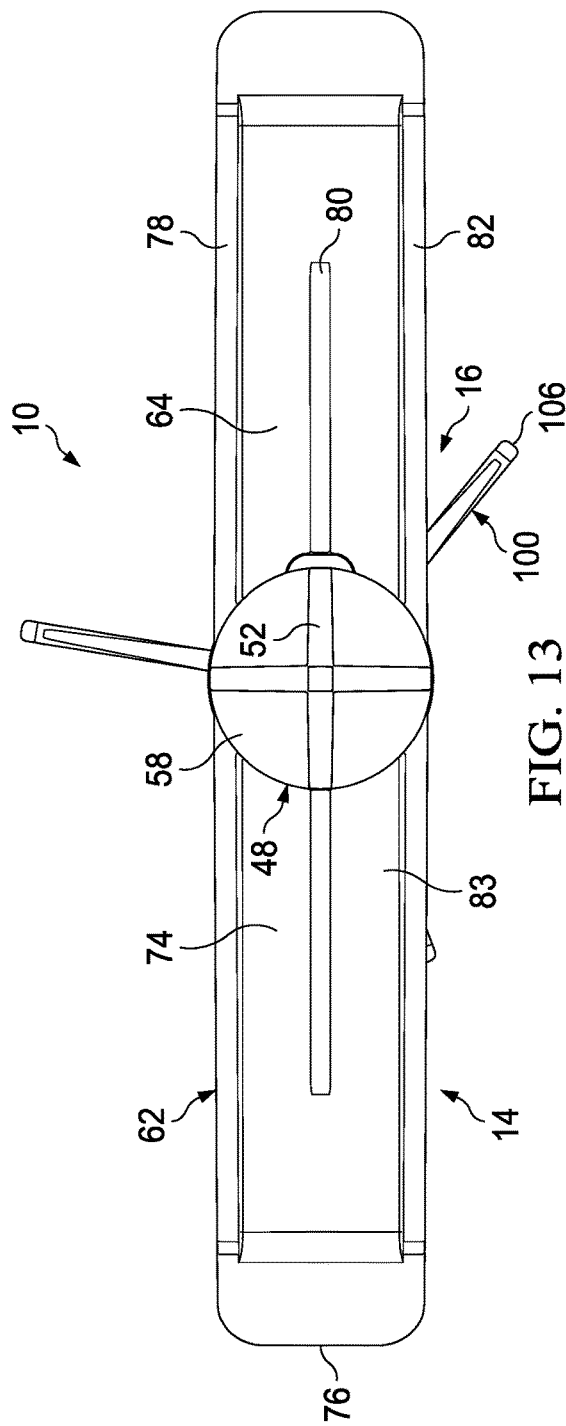

SUPPORT POLE SYSTEM FOR SUPPORTING ARTICLES

CROSS-REFERENCE TO RELATED APPLICATIONS

This application is a continuation of U.S. patent application Ser. No. 17/015,389, filed Sep. 9, 2020, now U.S. Pat. No. 11,178,959, which is incorporated herein by reference in its entirety for all purposes.

BACKGROUND

People that spend time outdoors in or near wet environments, such as fishermen, hunters, hikers, campers, beachgoers, etc., may find themselves in situations where it is undesirable to rest equipment and articles directly on the ground where it is wet or muddy or where they are surrounded by water so that the articles could be submerged in water. When wading offshore into bodies of water, they may be a great distance from dry ground so that it is inconvenient to have to return to the shore to rest their articles. Moreover, those who fail to monitor articles left on shores or along rising creeks and rivers may later find that the area where the articles were left have become covered with water during times of high tide or heavy surf or as a result of the rising water. This can result in the articles becoming wet or even being washed away. Accordingly, it would be desirable to have a device or system that would allow one to secure their equipment or articles above the water when offshore, above wet or muddy ground, or where there is the possibility that surf or rising water may encroach the area where the articles are located.

BRIEF DESCRIPTION OF THE DRAWINGS

For a more complete understanding of the embodiments described herein, and the advantages thereof, reference is now made to the following descriptions taken in conjunction with the accompanying figures, in which:

FIG. 1 is a front perspective view of a support pole system in a collapsed or retracted configuration and constructed in accordance with particular embodiments of the invention;

FIG. 2 is a side elevational view of a support pole of the support pole system of FIG. 1, shown with coupling mechanisms of the support pole in cross section;

FIG. 8 is a front elevational view of the support pole system of FIG. 1;

FIG. 9 is a rear elevational view of the support pole system of FIG. 1;

FIG. 12 is a top plan view of the support pole system of FIG. 1;

FIG. 13 is a bottom plan view of the support pole system of FIG. 1; and

DETAILED DESCRIPTION

Figure 3:
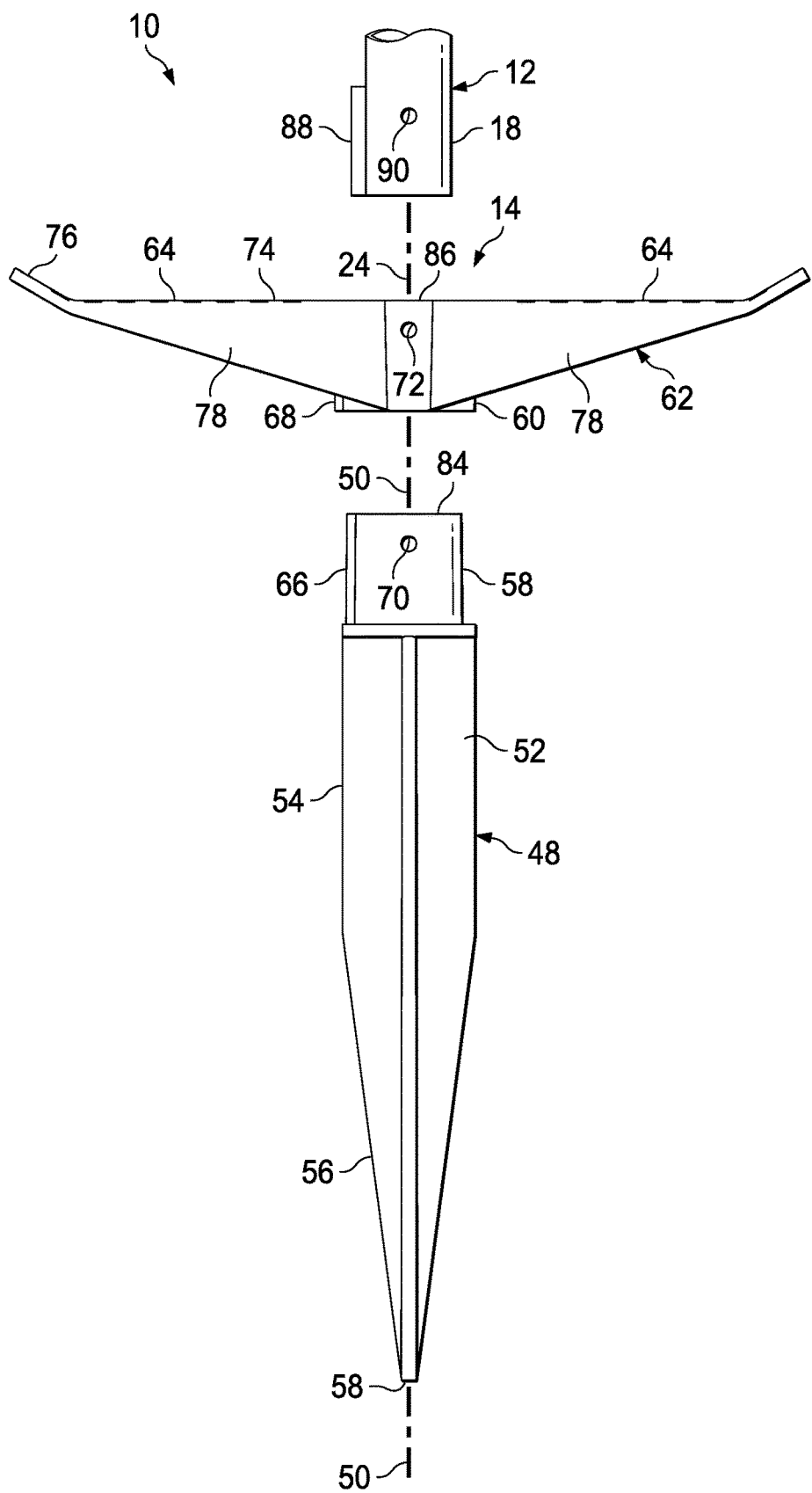
FIG. 3 is a front elevational view of a base assembly and lower pole section of the support pole system of FIG. 1, shown with components of the base assembly exploded apart.

Referring to FIG. 1, a support pole system 10 is shown for supporting various articles above the ground or earth. The support pole system 10 includes a support pole 12, a base assembly 14 that couples to the lower end of the support pole 12, and a head piece 16 that couples to the upper end of the support pole 12.

As is shown, the support pole 12 is a collapsible support pole that is formed from separate elongated pole sections 18, 20, 22 that couple one to another. In the embodiment shown, there are three pole sections that form the support pole 12. In other instances, there may be more or less than three pole sections, such as two pole sections, four pole sections, etc., that form the support pole 12. The pole sections 18, 20, 22 are shown as telescoping pole sections to provide the collapsibility of the support pole 12. Each of the pole sections 18, 20, 22 may be in the form of an elongated tubular body. At least a portion or all of the lowermost pole section 18 may have a hollow interior configured for or with an inner diameter sized for receiving all or a portion of the length of the intermediate pole section 20. Likewise, all or a portion of the intermediate pole section 20 may have a hollow interior configured for or having an inner diameter sized for receiving all or a portion of the uppermost pole section 22. All or a portion of the uppermost pole section 22 may be hollow or have hollow interior or be solid or non-hollow, since it does not need to receive a further pole section in the embodiment shown. The inner and outer diameter of all or portions of the pole sections 18, 20, 22 may be sized and configured so that they are closely received within the other sections, while allowing sliding telescoping movement relative to one another.

Other telescoping configurations for the collapsible support pole 12 may also be used. For example, the intermediate pole section 20 may have a larger inner diameter for receiving both the upper end of the lowermost pole section 18 and the lower end of the uppermost pole section 22, with both the lower and upper pole sections 18, 22 being movable relative to the intermediate pole section 20.

In other embodiments, non-telescoping pole sections may be used for the pole sections. These may be pole sections with ends that releasably couple to and engage one another, such as a male/female engagement, so that the pole sections are coupled together when the support pole is in an extended configuration and may be separated when the support pole 12 is changed to a collapsed configuration to thus shorten or lengthen the support pole 12. In other instances, the non-telescoping pole sections may be pivotally coupled together at the ends, such as through the use of hinges, so that the pole sections can be folded or pivoted relative to one another so that the support pole 12 can be between collapsed and extended configurations to shorten or length the support pole 12.

In most embodiments, the support pole 12 will be a telescoping support with the pole sections 18, 20, 22 being movable along all or a portion of their lengths relative to one another so that the support pole 12 can be shortened or lengthened to various lengths. A central longitudinal axis 24 extends through the support pole system 10 and through the pole sections 18, 20, 22 when they are aligned and joined together. The sections 18, 20, 22 are movable relative to one another along the longitudinal axis 24 between the collapsed or retracted and extended positions to shorten and lengthen the support pole 12. The pole sections 18, 20, 22 may be moved to provide an adjustable length ranging anywhere from 2 feet to 10 feet or more, as measured from the base assembly 14 when the pole 12 is coupled thereto. The pole sections 18, 20, 20 may be each of the same or different lengths. In certain embodiments, the pole sections may be movable or adjustable to provide a length or height of the support pole 12 that may be at least equal to, and/or between any two of 2 feet, 2½ feet, 3 feet, 3½ feet, 4 feet, 4½ feet, 5 feet, 5½ feet, 6 feet, 6½ feet, 7 feet, 7½ feet, 8 feet, 8½ feet, 9 feet, 9½ feet, and 10 feet.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

All or a portion of any one or all the pole sections 18, 20, 22 may have indicia or demarcations, such as for measuring length, depth, height, etc., or providing other information.

Referring to FIG. 2, each of the pole sections 18, 20, 22 has cooperating alignment members 26, 28, 30 that engage one another to facilitate aligning the elongated pole sections 18, 20, 22 in a selected rotational position about the longitudinal axis 24 relative to one another as the elongated pole sections 18, 20, 22 are moved between collapsed retracted position and extended positions of the support pole 12. The alignment members 26, 28, 30 also help prevent rotation of the pole sections 18, 20, 22 relative to one another. The alignment members 26 may be in the form of a channel or projection formed along all or a portion of the lengths of one or more of the pole sections 18, 20, 22. As can be seen in FIG. 2, the lowermost pole section has an inwardly projecting channel 26 formed in the section wall that extends along the length of the pole section 18 that projects into the interior of the pole section 18 and is configured to be received in or engage a similarly formed channel 28 formed in the wall of the intermediate section 20. The channel 28 of the intermediate pole section 20 likewise projects inwardly into the interior of the pole section 20 and is configured to be received in or engage a similarly formed channel 30 in the wall of the upper section 22. The channels 26, 28, 30 keep the sections 18, 20, 22 aligned in particular rotational orientation so that they are always aligned in the same rotational orientation, even when moved between the collapsed retracted configurations and the fully extended configuration.

In other embodiments, one or more of the channels of the different sections 18, 20, 22, may be eliminated, and instead one or more dimples or projections formed in the wall may be received within and ride along the channel of one of the other pole sections. For example, instead of a channel 26, one or more inwardly projecting dimples or projections (not shown) may be formed on the upper end of pole section 18 or along the length of the lower pole section 18 that is received within and rides within the channel 28 formed on the intermediate section 20. The dimple or projection on the lower section 18 will still facilitate alignment and prevent relative rotation with respect to the middle section 20. Other similar variations of this may also be used.

Releasable locking mechanisms 32, 34 are provided with the support pole 12 to keep the pole sections 20 and 22 held and locked in placed at various longitudinal positions with respect to pole sections 18 and 20, respectively, to selectively lengthen or shorten the pole 12. The locking mechanisms 32, 34 may be continuously variable locking mechanisms that allow the pole sections to be moved to an infinite number of different positions. Alternatively, the locking mechanisms 32, 34 may be discretely variable locking mechanism that allow the pole sections to be moved to a finite number of different selected positions. Examples of suitable locking mechanisms for the locking mechanisms 32, 34 may include a detent locking mechanism, a push-button locking mechanism, a split-collar lock locking mechanism, a set screw locking mechanism, a twist lock clamp locking mechanism, an internal twist lock with an internal expander locking mechanism, a cam lock locking mechanism, an internal cam lock locking mechanism, a lever clamp locking mechanism, a clutch lock locking mechanism, etc. Other locking mechanisms for locking telescoping members may also be used. The locking mechanisms 32, 34 may be external locking mechanisms, all or a portion of which are visible from the exterior of the pole 12. The locking mechanisms 32, 34 may also be internal locking mechanisms that are housed within the interior of the pole sections and are thus not visible from the exterior of the pole 12.

In the embodiment shown if FIG. 2, the locking mechanisms 32, 34 constitute clutch-type locking mechanisms that employ an internally threaded locking cap 36 that threads onto external threads 38 at the upper ends of the pole sections 18, 20. An inner locking compression ring 40, which may be formed of nylon or other resilient plastic or polymeric material, is seated inside the locking cap 36. When the locking cap 36 is threaded and tightened over the external threads 38 at the upper ends of the pole sections 18, 20, the compression ring 40 is compressed against the exterior surface of the smaller diameter pole section 20, 22, respectively, so that pole sections are frictionally held in place. Such locking mechanisms are continuously variable locking mechanisms that allow the telescoping pole sections 20, 22 to be moved to infinite variable positions relative to the pole sections 18, 20, respectively. The exterior of the locking cap 36 may be knurled or otherwise textured to facilitate gripping while tightening and loosening the locking cap 36.

The telescoping pole 12 may include a combination of locking mechanisms, as well. As shown in FIG. 2, a spring detent locking mechanism 42 is shown having a spring biased push button 44 on the lower end of pole section 20. The push button 44 projects from an aperture formed in the wall of the pole section 20 and is sized and configured to be received in aperture 46 formed in the upper end of the wall of the lower pole section 18. A similar detent locking mechanism (not shown) may be used on the pole sections 20, 22, as well. Such detent locking mechanism 42 may be used to further secure the pole sections 18, 20, 22 together.

The detent mechanism 42 may be used in combination with the locking mechanisms 32, 34 to help prevent the pole sections from being pulled apart while they are being extended and/or provide an indication of when the pole sections 18, 20, 22 are in a fully extended position while they are being extended. Because the pole sections 18, 20, 22 are prevented from rotation about the longitudinal axis 24, the push button 44 and aperture 46 will be always be aligned. In the embodiment shown in FIG. 2, as the pole section 20 is pulled out of the pole section 18, the retracted push button 44 will ride along the interior wall of the pole section 18 until it reaches aperture 46. Upon the spring biased push button 44 reaching the aperture 46 it will spring outward so that the push button 44 is received in the aperture 46, locking the pole sections 18, 20 together so that the pole section 20 cannot be extended further.

In other embodiments, the detent mechanism 42 can be used to lock the pole sections 18, 20, 22 in a number of different positions by providing a plurality of longitudinally spaced apart apertures 46 formed along the lengths of the pole sections 18, 20, 22 for use with a cooperating spring push buttons 44 or similar spring biased detent members of the other pole sections.

Referring to FIG. 3, the base assembly 14 couples to the lower end of lower pole section 18 of the support pole 12. The base assembly 14 includes a stake 48 configured for insertion into the ground or earth for supporting the support pole 12 in an upright position above the ground or earth.

The stake 48 is configured as an elongated member that has a central longitudinal axis 50 that passes through the center of the stake 48 along the length of the stake 48 and may be parallel and/or concentric with the longitudinal axis 24. The stake 48 is provided with laterally projecting members 52 that extend radially outward from the central axis 50. In the embodiment shown, the projecting members 52 are in the form of fins, vanes or planar members 54 that are joined together at their inner edges along their lengths to a central portion or at the central longitudinal axis 50 of the stake 48. In the embodiment shown, there are four fins or planar members 52 that are circumferentially spaced apart an equal distance (i.e., 90°) or non-equal distance from one another. It has been found that four radially spaced apart planar members or fins 52 provides better support for the support pole system 10 so that it resists movement in all directions when planted in the earth or soil. There may be fewer or more fins or planar members 54, such as 2 fins, 3 fins, 5 fins, 6 fins, etc., however, that may each be circumferentially spaced apart an equal or non-equal distance from one another. The spaced apart fins or members 52 help prevent rotational (i.e., about axis 50) movement of the stake 48 when it is planted in the earth or soil.

Each fin or planar member 52 is shown having a upper section 54 having a rectangular profile that extends downward from the upper end of the stake 48 to a tapered section 56 that tapers or narrows in width from the upper section 54 to form a pointed end 58 of the stake 48 that facilitates insertion of the stake 48 into the soil or earth. The width of the upper section 54, as well as portions of the tapered section 56, that projects laterally from the central axis 50 may range from at least ½ inch or more, more particularly from ¾ inch or more, and still more particularly from 1 inch or more. In particular embodiments, all of the upper section 54 and portions of the lower section may project a distance from the central axis that may be at least equal to, and/or between any two of ½ inch, ¾ inch, 1 inch, 1¼ inch, 1½ inch, 1¾ inch, 2 inches, 2¼ inches, 2½ inches, 2¾ inches, 3 inches, 3¼ inches, 3½ inches, 3¾ inches, 4 inches, 4¼ inches, 4½ inches, 4¾ inches, and 5 inches.

The projecting fins or planar members 52 may each provide a lateral side surface area of from 3 in$^2$ to 90 in$^2$ that exerts lateral forces to the earth or soil to prevent lateral, rotational (i.e., about longitudinal axis 24), and/or pivotal movement of the pole system 10 once it is planted. In particular embodiments, the projecting fins or planar members 52 may each provide a side surface area that may be at least equal to, and/or between any two of 3 in$^2$, 4 in$^2$, 5 in$^2$, 6 in$^2$, 7 in$^2$, 8 in$^2$, 9 in$^2$, 10 in$^2$, 11 in$^2$, 12 in$^2$, 13 in$^2$, 14 in$^2$, 15 in$^2$, 16 in$^2$, 17 in$^2$, 18 in$^2$, 19 in$^2$, 20 in$^2$, 21 in$^2$, 22 in$^2$, 23 in$^2$, 24 in$^2$, 25 in$^2$, 26 in$^2$, 27 in$^2$, 28 in$^2$, 29 in$^2$, 30 in$^2$, 31 in$^2$, 32 in$^2$, 33 in$^2$, 34 in$^2$, 35 in$^2$, 36 in$^2$, 37 in$^2$, 38 in$^2$, 39 in$^2$, 40 in$^2$, 41 in$^2$, 42 in$^2$, 43 in$^2$, 44 in$^2$, 45 in$^2$, 46 in$^2$, 47 in$^2$, 48 in$^2$, 49 in$^2$, 50 in$^2$, 51 in$^2$, 52 in$^2$, 53 in$^2$, 54 in$^2$, 55 in$^2$, 56 in$^2$, 57 in$^2$, 58 in$^2$, 59 in$^2$, 60 in$^2$, 61 in$^2$, 62 in$^2$, 63 in$^2$, 64 in$^2$, 65 in$^2$, 66 in$^2$, 67 in$^2$, 68 in$^2$, 69 in$^2$, 70 in$^2$, 71 in$^2$, 72 in$^2$, 73 in$^2$, 74 in$^2$, 75 in$^2$, 76 in$^2$, 77 in$^2$, 78 in$^2$, 79 in$^2$, 80 in$^2$, 81 in$^2$, 82 in$^2$, 83 in$^2$, 84 in$^2$, 85 in$^2$, 86 in$^2$, 87 in$^2$, 88 in$^2$, 89 in$^2$, and 90 in$^2$. If the fins or planar members 52 of the stake 48 are oriented parallel to one other, such as fins or members 52 on opposite sides of the stake 48, this surface area is increased for resistance to movement of the pole system 10 by the combined surface area of the fins or planar members 52.

Furthermore, the fin or planar member 52 should be of a thickness or transverse cross-sectional area that facilitates ease of insertion into the soil or earth. In certain embodiments, each fin or planar member 52 may be wedge shaped or tapered in thickness from a greater thickness at the upper end of the upper section 54 to a narrow thickness at the lower end of the tapered section 56. In certain embodiments, all or a portion of the fin or planar member 52 and/or upper section 54 and/or lower section 56 may have a thickness, which may be uniform, non-uniform, or tapered along its length and/or width, that may be at least equal to, and/or between any two of 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, 0.30 inch, 0.31 inch, 0.32 inch, 0.33 inch, 0.34 inch, 0.35 inch, 0.36 inch, 0.37 inch, 0.38 inch, 0.39 inch, and 0.40 inch.

The stake 48, the fins or planar members 52, as well as any other portions of the stake 48 may have some degree of flexibility but should be of sufficient rigidity and strength so that they do not crack, break or significantly bend or otherwise deform when subjected to insertion into the earth and soil, including encountering and impacting buried objects, such as rocks, stones, roots, etc. Moreover, the stake 48 the fins or planar members 52 should be resistant to twisting forces during use when inserted into the earth or soil to prevent the rotation about the longitudinal axis 50 of the stake 48 or dislodgment of the support pole system 10, such as from lateral forces that may tend to pivot or push over the support pole system 10 after it is planted.

In certain embodiments, the fins or planar members 52 may not extend the full length of the stake 48. Thus, for example, rectangular or tapered fins or planar members 52 may be provided at the upper portion of the stake 48, while the remaining bottom portion of the stake 48 is formed as a narrow shaft, such as a tubular or cylindrical shaft, with a pointed or tapered end point that facilitates insertion of the stake 48 into the soil or earth.

As shown in FIG. 3, the upper end of the stake 48 is provided with an upward projecting neck 58 that is configured for being closely received within an opening of a cooperating collar 60 of a cross member 62 of the base assembly 14.

Figure 4:
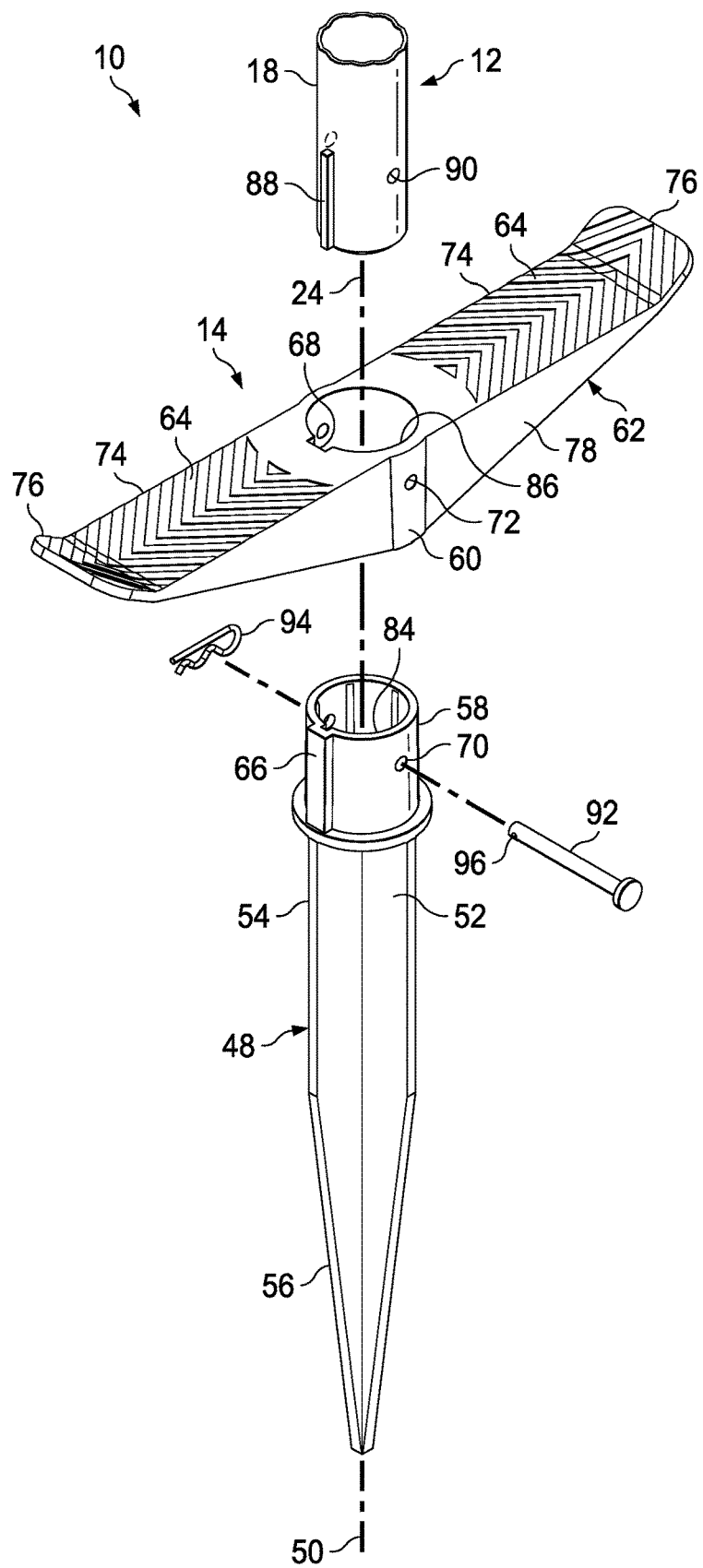
FIG. 4. is a front perspective view of the base assembly and lower pole section of FIG. 3.

The cross member 62 is configured with opposite extending footrest members or plates 64 that extend laterally from opposite sides of the collar 60. Referring to FIG. 4, both the neck 58 and collar 60 have cooperating alignment members 66, 68, respectively. In the embodiment shown, the alignment member 66 of the stake constitutes a projecting tongue or member that extends longitudinally along one side of the neck 58. The alignment member 68 of the collar 60 constitutes a longitudinal groove or channel formed along one side of the collar 60. When the cross member 62 is positioned on the stake 48, the collar 60 is positioned over the neck 58, with the tongue or member 66 being received and sliding within the groove or channel 68. This allows the cross member 62 to be mounted in only one position relative to the stake 48. This also ensures locking pin holes 70, 72 that are formed in the neck 58 of the stake 48 and collar 60 of cross member 62 are concentrically aligned when the cross member is mounted on the stake 48.

As shown in FIGS. 3-4, when the cross member 62 is mounted on the stake 48, the opposite footrest members 64 each extend perpendicularly to the longitudinal axis 50 of the stake 48. All or a portion of each footrest member 64 may be formed as a flat planar plate having a flat planar upper surface that is also perpendicular to the longitudinal axis 50. In the embodiment shown, each footrest 64 has a flat planar main body 74 that extends from opposite sides of the collar 60. The outer end portions 76 of each footrest 64 may be short portions of the plate or member forming the cross member 62 that are angled or flared upward, as shown. This may help prevent one's foot from sliding off the end of the footrest 64 during insertion of the stake 48. The flared ends 76 may also provide an area that does not get submerged or buried in the ground or earth and is lifted or spaced from the ground surface when the pole system is planted so that it can be used to help in lifting or prying the cross member 62 up when removing the support pole system 10 from the earth or soil in which it is planted. All or a portion of the upper surface of the footrest members 64, including the main body 74 and outer ends 76 may be knurled, ribbed, ridged, or otherwise texturized (as shown) to provide a non-slip upper surface.

In certain embodiments, the footrests 64 may be curved or arcuate plate members that may have a straight or curved transverse cross section along all or a portion of their lengths. If the footrests 64 are curved or arcuate, the footrests may be configured so that the footrest 64 is curved with concavity that is oriented upward. This may eliminate the need for an upwardly flared end portion 76 or the flared end portion may be a curved or arcuate portion of a smaller radius of curvature compared to the main body 74, which may have a greater radius of curvature. The radius of curvature for the footrest may be a constant or variable radius of curvature. In certain embodiments, the radius of curvature of all or portions of the footrest 64 may be at least equal to, and/or between any two of 0.2 ft, 0.3 ft, 0.4 ft, 0.5 ft, 0.6 ft, 0.7 ft, 0.8 ft, 0.9 ft, 1.0 ft, 1.1 ft, 1.2 ft, 1.3 ft, 1.4 ft, 1.5 ft, 1.6 ft, 1.7 ft, 1.8 ft, 1.9 ft, and 2.0 ft.

The total overall linear length of each footrest 64 or the total linear length of each main body 74 of the footrest may range from 4 inches to 12 inches in length, with all or a portion of the linear width ranging from ½ inch to 3½ inches. In certain embodiments, the total length of each footrest 64 or the total length of each main body 74 may be at least equal to, and/or between any two of 4 inches, 4½ inches, 5 inches, 5½ inches, 6 inches, 6½ inches, 7 inches, 7½ inches, 8 inches, 8½ inches, 9 inches, 9½ inches, 10 inches, 10½ inches, 11 inches, 11½ inches, and 12 inches. In certain embodiments, all or a portion of the width of each footrest 64 or each main body 74 may be at least equal to, and/or between any two of ½ inch, ¾ inch, 1 inch, 1¼ inch, 1½ inch, 1¾ inch, 2 inches, 2¼ inches, 2½ inches, 2¾ inches, 3 inches, 3¼ inches, and 3½ inches.

If a flared end portion 76 is provided at the end of the footrest 64, it may have a length of from ¼ inch to 2½ inches and may have the same or a different width than that of the main body 74. In certain embodiments, the flared end portion 76 at the end of the footrest 64 may have a length may be at least equal to, and/or between any two of ¼ inch. ½ inch, ¾ inch, 1 inch, 1¼ inch, 1½ inch, 1¾ inch, 2 inches, 2¼ inches, and 2½ inches.

In some embodiments, the footrest members 64 may be pivotally mounted (e.g., hinged) to the collar 60, the pole section 18, and/or the stake 48 in a manner that allows them to be pivoted relative to the longitudinal axis 24 so that the footrest members 64 are positioned adjacent to the pole 12 or stake 48 in a retracted position for carry and storage. In such instances, the footrest members 64 may be pivoted to an extended position where they extend laterally away or perpendicular to the longitudinal axis 50 of the stake 48 or axis 24. A releasable locking mechanism (not shown) may keep the pivotal footrest members in the retracted and/or extended positions.

The undersurface of the footrests 64 should provide a sufficiently large surface area or footprint area that prevents or inhibits the base assembly 12 of the support pole system 10 from sinking or being submerged too deeply in soft mud, wet soils, loose sand, etc., such as found offshore or under bodies of water, such as riverbeds, lakebeds, swamps, etc. In certain embodiments, the total undersurface or foot print area of the footrests 64, including or excluding the undersurface of the flared outer portions 76, may range from 12 $in^2$ to 40 $in^2$ to provide a surface area to help prevent the sinking of the base assembly 14 or support pole system 10 in such soft ground or earth. In certain embodiments, the total undersurface area or foot print area provided by the footrests 64, including or excluding the undersurface of the flared outer portions 76, may be at least equal to, and/or between any two of 12 $in^2$, 13 $in^2$, 14 $in^2$, 15 $in^2$, 16 $in^2$, 17 $in^2$, 18 $in^2$, 19 $in^2$, 20 $in^2$, 21 $in^2$, 22 $in^2$, 23 $in^2$, 24 $in^2$, 25 $in^2$, 26 $in^2$, 27 $in^2$, 28 $in^2$, 29 $in^2$, 30 $in^2$, 31 $in^2$, 32 $in^2$, 33 $in^2$, 34 $in^2$, 35 $in^2$, 36 $in^2$, 37 $in^2$, 38 $in^2$, 39 $in^2$, and 40 $in^2$.

Figure 5:
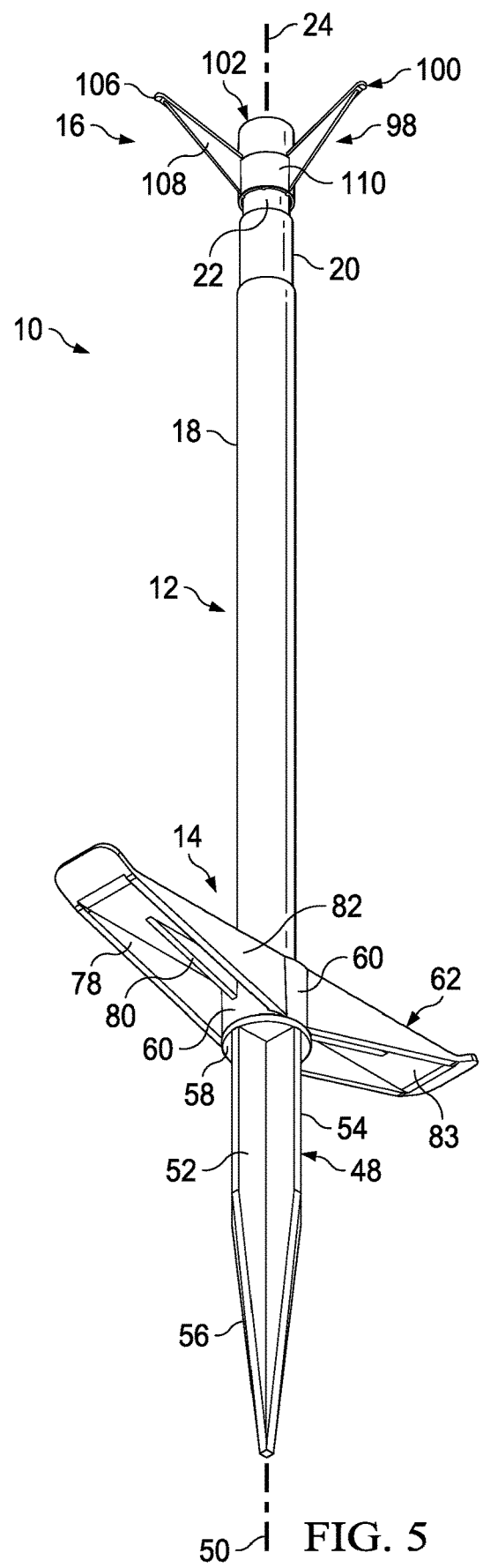
FIG. 5 is a rear perspective view of the support pole system of FIG. 1.

Each footrest 64 of the cross member 62 may further have one or more lower projecting members that engages the ground or earth to prevent rotation of the cross member about the longitudinal axis 24, 50 of the support pole 12 or stake 48. As shown in FIG. 5, the projecting members may be in the form downward projecting ribs or fins, such as the flanges, ribs or fins 78, 80, 82, that extend outward from the collar 60 and are joined along their upper edges to each footrest 64. As shown, the flanges, ribs or fins 78, 82 constitute outer ribs or members that are joined to and extend along all or a portion of the length of the lower surface of the main footrest body 74. The members 78, 82 are shown configured as triangular members that coextend along their inner ends along all or portion of the length of the collar 60 and taper in height from their radially inner ends at the collar 60 to a point at their outer ends, which terminate at the outer ends of the main body 74 to the flared portion 76.

The rib or fin 80 constitutes an inner rib or member that is located between the members 78, 82. The rib or fin 80 may also be configured as a triangle, which may the same or a different size from the members 78, 82, and which is joined to and extends along all or a portion of the length of the lower surface of the main footrest body 74. In the embodiment shown, the rib or fin 80 is smaller, with the inner end of the member 80 extending along only a portion of the collar 60 and along only a portion of the portion of the length of the lower surface of the main footrest body 74 and tapering in height from the inner end at the collar 60 to a point at its outer end.

The ribs or fins 78, 80, 82 may project perpendicularly downward relative to the footrest 64 or parallel to the longitudinal axis of the stake 50 along all or a portion of the length of the members 78, 80, 82. In other embodiments, the ribs or fins 78, 80, 82 may project from the footrest 64 at a non-perpendicular angles along all or a portion their lengths.

While the ribs or fins 78, 80, 82 are shown configured as triangular members, in other embodiments the members 78, 80, 82 may be non-triangular in shape, such as rectangular, trapezoidal, quadrilateral, curvilinear, etc.

The ribs or fins 78, 80, 82 define one or more recessed areas 83 under the main plate body 74 that can receive earth or soil when the base assembly 14 is inserted into the ground or earth. This helps resist lateral, rotational, and pivotal movement of the pole system 10, locking the pole system 10 in place relative to the ground or earth. Each rib or fin 78, 80, 82 may provide a side surface area of from 1 $in^2$ to 45 $in^2$ that helps resist lateral, rotational, and pivotal forces from the earth or soil. In particular embodiments, the projecting fins or planar members 52 may each provide a side surface area that may be at least equal to, and/or between any two of 1 $in^2$, 2 $in^2$, 3 $in^2$, 4 $in^2$, 5 $in^2$, 6 $in^2$, 7 $in^2$, 8 $in^2$, 9 $in^2$, 10 $in^2$, 11 $in^2$, 12 $in^2$, 13 $in^2$, 14 $in^2$, 15 $in^2$, 16 $in^2$, 17 $in^2$, 18 $in^2$, 19 $in^2$, 20 $in^2$, 21 $in^2$, 22 $in^2$, 23 $in^2$, 24 $in^2$, 25 $in^2$, 26 $in^2$, 27 $in^2$, 28 $in^2$, 29 $in^2$, 30 $in^2$, 31 $in^2$, 32 $in^2$, 33 $in^2$, 34 $in^2$, 35 $in^2$, 36 $in^2$, 37 $in^2$, 38 $in^2$, 39 $in^2$, 40 $in^2$, 41 $in^2$, 42 $in^2$, 43 $in^2$, 44 $in^2$, and 45 $in^2$. If the ribs or fins 78, 80, 82 are oriented parallel to one other, this surface area is increased for resistance by the combined surface area of the ribs or fins 78, 80, 82.

While each of the lower projecting members 78, 80, 82 engages the ground or earth with soil or earth being received in the recessed areas 83 to prevent movement of the cross member 62 and pole system 10, they also facilitate supporting, reinforcing and strengthening each footrest 64 so that the footrest 64 does not bend or break when force is exerted against the footrest 64 during insertion or lifting of the support pole system 10.

Each of the members 74, 76, 78, 80, 82 may have the same or different thicknesses. The thickness may vary depending upon the materials of the cross member 62. The materials, thickness, and configuration of the cross member 62 and the members 74, 76, 78, 80, 82 should be such that they provide sufficient structural strength and rigidity so that they do not crack, break or significantly bend or otherwise deform when subjected to insertion into the earth and soil, including impacting buried objects, such as rocks, stones, roots, etc. Furthermore, the lower projecting ribs or members 78, 80, 82 should be of a thickness or transverse cross-sectional area that facilitates ease of insertion into the soil or earth. In certain embodiments, the projecting ribs or members 78, 80, 82 may be wedge shaped or tapered in thickness from a greater thickness at the upper edge to a narrow thickness at the lower edge that is first inserted into the ground. In certain embodiments, all or a portion of the various members 74, 76, 78, 80, 82 may have a thickness, which may be uniform, non-uniform, or tapered, that may be at least equal to, and/or between any two of 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, 0.30 inch, 0.31 inch, 0.32 inch, 0.33 inch, 0.34 inch, 0.35 inch, 0.36 inch, 0.37 inch, 0.38 inch, 0.39 inch, and 0.40 inch.

Referring to FIG. 4, the lower end of lower pole section 18 is sized and configured to be received within a central opening 84 of the neck 58 of the stake 48. An opening 88 of the collar 60 of the cross member 62 allows the lower end of the pole section 18 to be passed therethrough. In certain embodiments, the pole section 18 or the lower end of the pole section 18 may be provided with a projecting alignment member 88 that is sized and configured to cooperate with an alignment member of the stake neck 58. This may be in the form of a tongue or projection 88 that is received in a groove or channel of the neck 58, which may be formed by the walls of the projecting tongue 66 previously discussed. A stop or shoulder (not shown) provided in the neck 58 of the stake 48 may prevent further passage the pole section 18. When so aligned, locking pin holes 90 formed in the lower end of the pole section 18 concentrically align with the locking pin holes 70, 72 of the stake neck 58 and cross member collar 60 when the pole section 18 rests on the stop or shoulder (not shown) provided in the neck 58.

When the locking pin holes 70, 72, 90 are aligned, a locking pin or bolt 92 is passed through the holes 70, 72, 90 to secure or couple support pole 12 to the base assembly 14, with the stake 58, cross member 62, and pole section 18 being held or locked together with the pin or bolt 92. A cotter pin 94 that passes through aperture 96 formed in the pin or bolt 92 or other fastener that engages the pin or bolt 92 may selectively hold the pin 92 in place to prevent removal of the pin 92 during use. Other means for selectively holding the pin or bolt 92 in place may also be used, such as a threaded bolt and nut, a detent mechanism, a spring ball detent, etc.

In certain embodiments, the means for coupling the stake 58 and cross member 62 may be reversed or configured differently, while functioning similarly. For example, the cross member 62 may be provided with a lower projecting neck (not shown) that is received within a collar (not shown) of the stake 58. The lower end of the pole section 18 would then be inserted into an opening formed in the neck of the cross member. Other means for locking or coupling the stake 58, cross member 62, and pole section 18 together may also be used.

Figure 6:
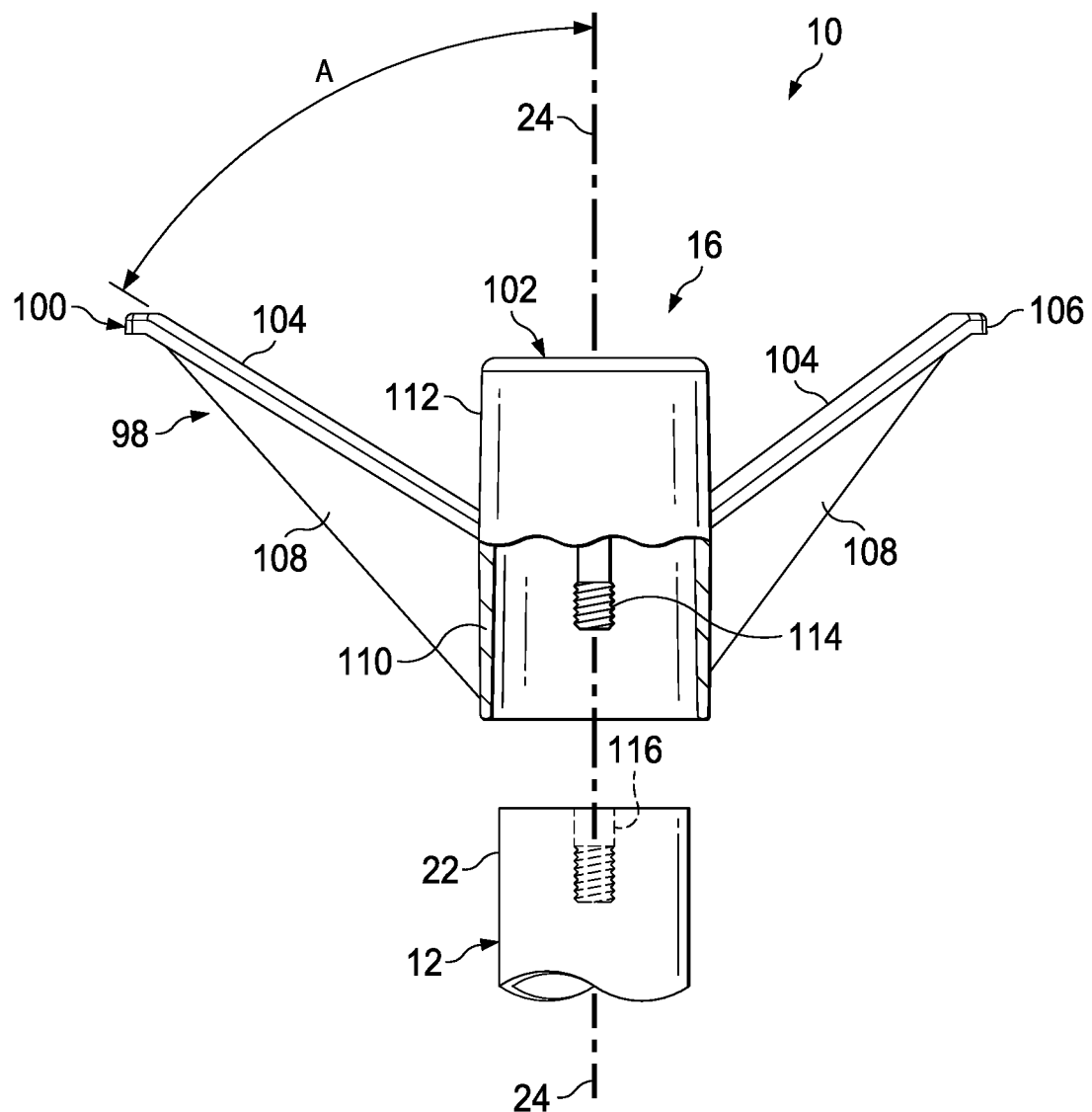
FIG. 6 is a rear elevational view of a head piece in partial cross section and an upper pole section of the support pole system of FIG. 1.

Referring to FIG. 6, the head piece 16 is shown in more detail. The head piece 16 is representative of many devices that can be held or supported by the support pole system 10. The head piece 16 may include such things as an article attachment device, a hook assembly, a hook, a carabiner, a support surface, a container, a box, a platform, a light, an LED light, a saw, a fishing rod holder, a decoy mount, a camera mount, a firearm holder, a firearm yoke, a magnet, etc., and combinations of these or other things.

In the embodiment shown, the head piece 16 constitutes an article attachment device in the form of a hook assembly 98 having radially extending hook arms 100 that extend from a head piece cap 102. One or more hook arms 100 may be provided on the hook assembly 98. In the embodiment shown there are three hook arms 100 that are circumferentially spaced about the head piece cap 102 an equal distance apart (i.e., 120° apart) at the same longitudinal position or height. In other instances, there may be less or more hook arms 100. The hook arms 100 may be equally or non-equally spaced apart. They may also be spaced at different longitudinal positions or heights.

Each hook arm 100 has an upper surface or flange 104 that has a flat or planar shape or configuration. This facilitates supporting the width of the webbing or straps for hanging various articles so that the webbing or straps lay flat across the upper surface 104 and do not gather or bunch up. The flat upper surface or flange 104 may also be configured at an angle A with respect the longitudinal axis 24 so that the items supported by the hook arm 100 are retained on the hook 100 and do not readily fall off the end of the hook arm and also that is not too steep so that the webbing or straps do not slide down the hook arm 100. The angle A may also be such an angle that articles or straps do not tend to slide down the hook arm 100 where they may tend to gather or bunch near the cap 102. In certain instances, the angle A of the flat upper surface or flange 104 of each hook arm 100 relative to the longitudinal axis 24 may be less than 90° to facilitate this. In certain instances, the angle A may range from 20° to 75°. In certain embodiments, the angle A may be at least equal to, and/or between any two of 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 480, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, and 75°. In other embodiments, the angle A may be greater than 75°. All or a portion of the upper surface 104 of the hook arm 100 may also be knurled, texturized, ribbed, ridged, or otherwise provided with a high friction surface to facilitate retaining articles or straps on the hook arm 100.

As shown, the end portion 106 of the hook arm 100 may be a flange that is flared or angled outward relative to the upper surface 106 or at an angle greater than the angle A. This may prevent articles being removed or lifted from the hook arm 100 from catching on the end of the hook arm 100. In other embodiments the end portion 106 may be flared or angled upward relative to the upper surface 106 or an angle less than the angle A to facilitate retaining articles on the hook arm 100 so that they do not fall off the end of the hook arm 100.

In other embodiments, all or a portion of the hook arms 100 may be non-flat or have curved or arcuate shape or configuration, with the upper surface or flange 104 having a upwardly facing concave configuration to retain articles on the hook arm 100.

The hook arms 100 may have the same or different lengths. The hook arms 100 may have a total projecting length, as measured from the point where the hook arm joins the cap 102 to the end portion 106 or to the end of the end portion 106, of from 1 inch to 6 inches or more. In certain applications, the hook arms 100 may have a total projecting length that may be at least equal to, and/or between any two of 1 inch, 1¼ inch, 1½ inch, 1¾ inch, 2 inches, 2¼ inches, 2½ inches, 2¾ inches, 3 inches, 3¼ inches, 3½ inches, 3¾ inches, 4 inches, 4¼ inches, 4½ inches, 4¾ inches, 5 inches, 5¼ inches, 5½ inches, 5¾ inches, and 6 inches.

The hook arms 100 may have projecting webs, ribs, or support structures 108 that extend along all or a portion of the upper surface or flange 104 to strengthen the hook arms 100 and facilitate supporting the upper surface or flange 104. The structures 108 may be configured as planar members that are parallel to the longitudinal axis 24 and project downward from the surface or flange 104. As shown, the structures 108 are joined at their base to the head piece cap 102 and extend toward the outer end 106. The structures 108 may be tapered in shape, narrowing in width from the cap 102 towards the outer end 106.

The head piece cap 102 is configured to carry and support the hooks 98 and to engage and couple to the support pole 12. In other applications, the head piece cap 102 may have other devices or structures coupled thereto or incorporated therewith depending upon the articles the support pole system 10 is intended to support. Thus, for example the head piece cap 102 may be configured to couple to or include any one or more of an article attachment device, a hook assembly, a hook, a carabiner, a support surface, a container, a box, a platform, a light, an LED light, a saw, a fishing rod holder, a decoy mount, a camera mount, a firearm yoke, a magnet, and other articles. Structures for each of these devices may be incorporated with or otherwise be releasably or non-releasably coupled to the head piece cap 102.

As shown, the head piece cap 102 includes a neck or sleeve portion 110 that extends from a head piece cap body 112, which may be a solid or hollow body. The neck or sleeve portion 110 is sized and configured to have a hollow interior to receive the upper end of the upper pole section 22. A threaded screw or bolt 114 is stationarily mounted to the cap body 112 and extends downward from the center of the cap body 112 into the interior of the neck or sleeve 110. A corresponding centrally located threaded hole or aperture 116 is formed in the upper end of the upper pole section 22 for receiving the screw or bolt 114 of the head piece cap 102. By rotating the head piece cap 102 clockwise or counter-clockwise over the upper pole section 22, the head piece cap 102 can be tightened or loosened for selectively coupling or uncoupling the cap 102 to and from the support pole 12. In certain applications, when the head piece cap 102 is fully tightened and coupled to the support pole 12, one or more or all of the hook arms 100 may be oriented at a perpendicular or other selected angle relative to the fins or planar members 52 of the stake 48 and/or footrest plates 64. When fully tightened, the head piece 16 may be stationarily mounted on the pole 12 so that it does not rotate or become loose during the supporting of the articles during use. In certain instances, a locking mechanism (not shown) may be provided with the head piece 16 to prevent its loosening or turning while in use.

Other methods and means may also be used to secure the head piece 16 to the support pole 12. For example, the head piece 16 and pole section 22 may be provided with cooperating structures such as male and female quick-release connectors or collets (not shown) so that the head piece may be quickly removed and replaced.

The various components of the pole system 10 may be formed from a variety of different materials. These may include metal materials, such as aluminum, iron, steel, titanium, metal alloys, etc., plastics or polymeric materials, which may be molded or extruded, composite materials, such as fiberglass, carbon fiber, etc., wood, etc., and combinations of these materials.

The support pole system may be light weight so that it is easy to carry. In certain embodiments, the support pole system may have a total weight of from 0.5 lb to 10 lbs, with from 5 lbs or less being typical, and from 1 lbs to 3 lbs being more typical.

In certain embodiments, a carrying case, bag, or other container (not shown) may be provided with the pole system 10 to facilitate carrying and storage of the various components. A strap (not shown) may also be provided with the pole system 10 to facilitate carrying the pole system 10.

In use, initially, the stake 48, cross member 62, pole 12 or pole sections 18, 20, 22 may be in a disassembled configuration. To assemble the pole system 10, cross member 62 is coupled to the stake 48 by positioning and mounting the collar of the cross member 62 over the stake neck 58. The projecting member 66 of collar 60 is received in channel 68 of the stake 48 to facilitate proper alignment of the stake 48 and cross member 62. The lower pole section 18 is inserted into the opening 84 of the neck 58. Alignment member 88 and channel of alignment member 66 may facilitate proper alignment of the pole section 18. With the pole section 18 inserted and properly aligned, the locking pin apertures 70, 72, 90 will also be aligned. The locking pin 92 can be then inserted through the apertures and locked in place with the pin 94. This couples and secures the pole section 18 to the base assembly 14.

The pole sections 20, 22 may already be telescoped and housed within the lower section 18 initially. If not, they may be inserted into one another, with the pole section 20 inserting into lower pole section 18, with the projection 26 on section 18 being received within channel 28 of the intermediate section 20. The detent 42 of pole section 20 may also be received within aperture 46 of lower section 18 to further securing the pole sections 18, 20 together. Likewise, pole section 22 is inserted into intermediate section 20, with the projection 28 of section 20 being received within channel 30 of pole section 22. The alignment members 26, 28, 30 thus ensure the sections are properly aligned during assembly as well as prevent rotation of the sections 18, 20, 22 relative to one another.

The sections 18, 20, 22 can be moved longitudinally relative to one another to provide the desired length or height of the pole system 10. The releasable locking mechanisms 32, 34 facilitate locking the sections 18, 20, 22 in position relative to one another.

Figure 7:
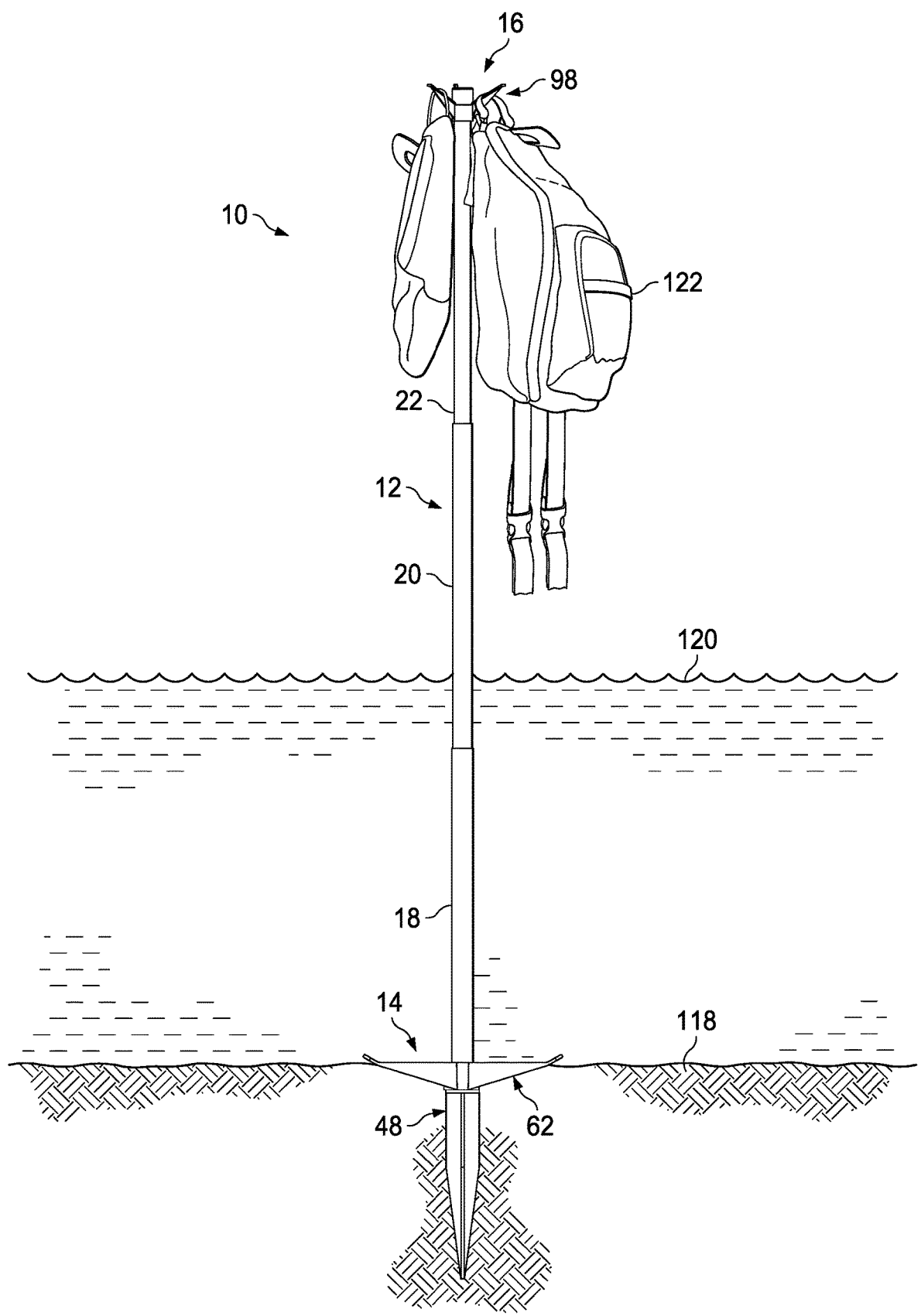
FIG. 7 is front elevational view the support pole system of FIG. 1 in an extended configuration and planted in the ground or earth below a body of water.
Figure 10:
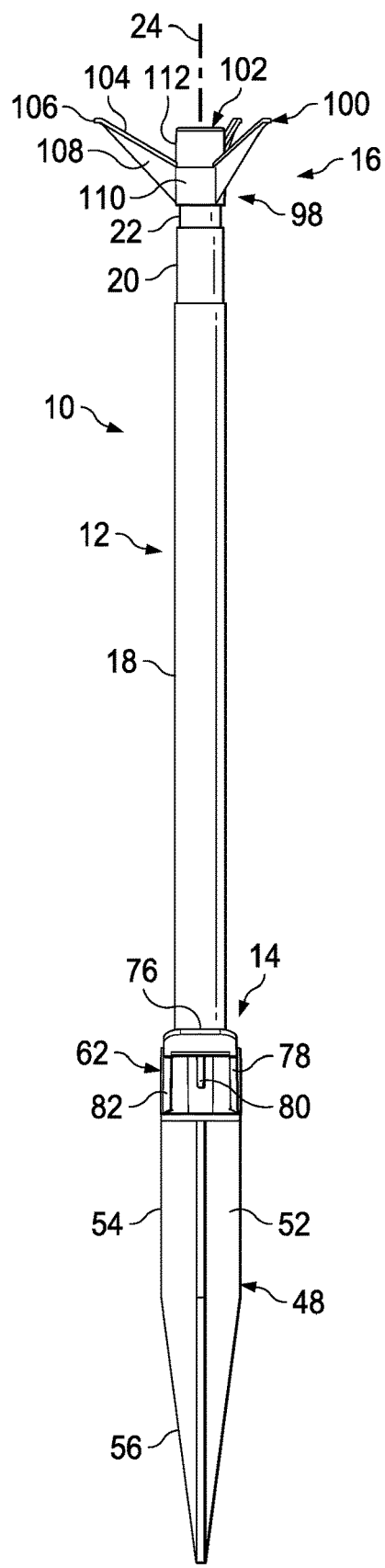
FIG. 10 is a right-side elevational view of the support pole system of FIG. 1.
Figure 11:
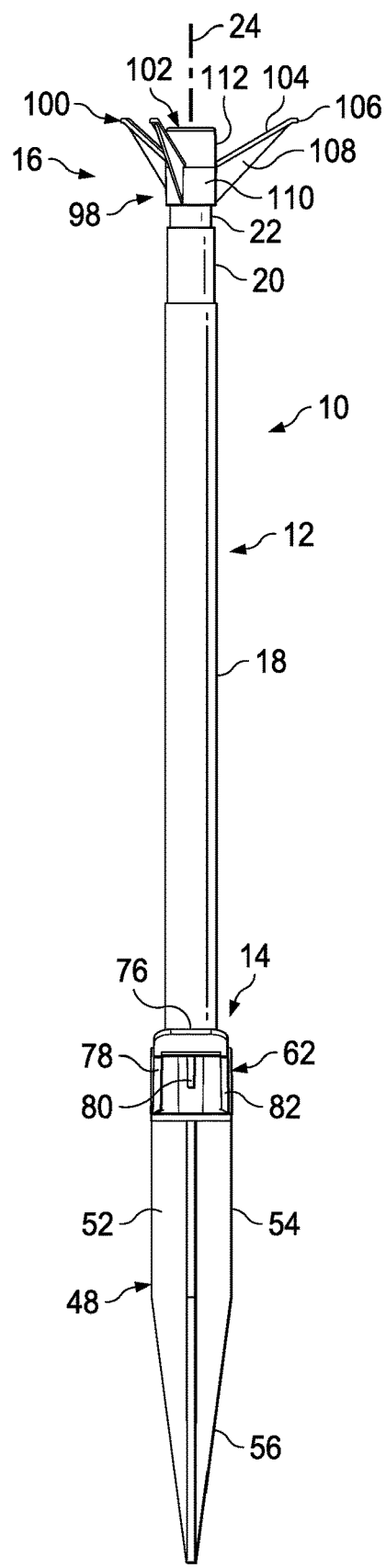
FIG. 11 is a left side elevational view of the support pole system of FIG. 1.
Figure 14:
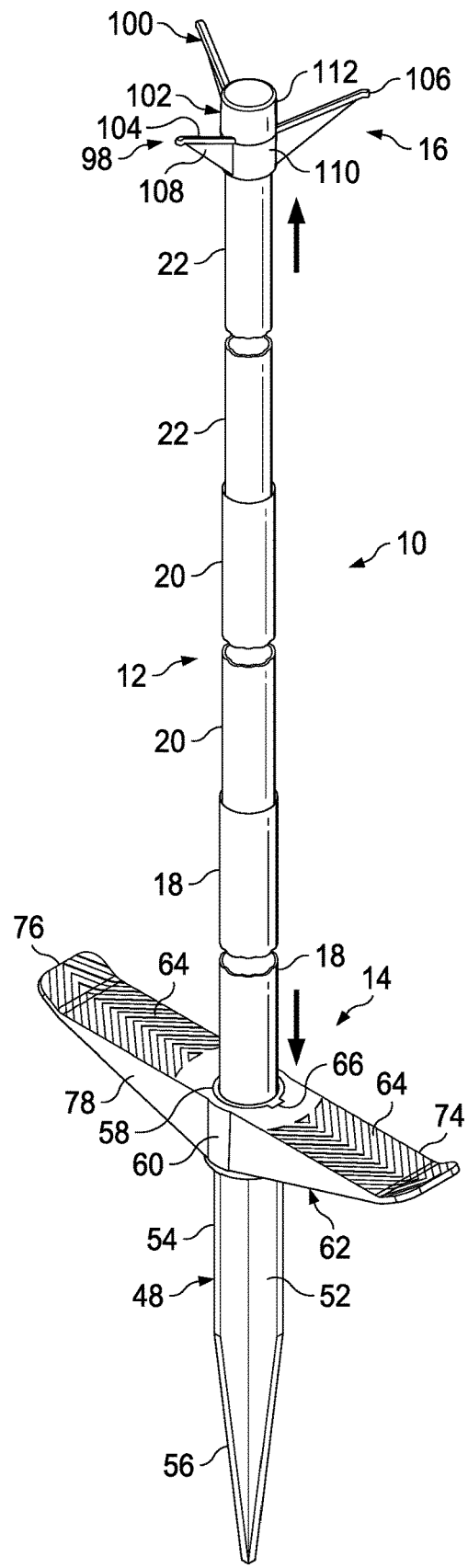
FIG. 14 is a front perspective view of a support pole system in extended configuration.

With the pole system 10 configured in the desired length, the pole system 10 may be inserted into the ground or earth 118, as shown in FIG. 7. The footrest members 64 allow the user to press down on the cross member 62 to facilitate insertion of the stake 48 in the earth or soil. With the stake 48 inserted into the ground, the fins 52 of the stake 48 provide a surface area that resists lateral, rotational, and pivotal movement of the pole system 10 from the forces exerted by fins 52 against the soil or earth in which the stake 48 is planted. The ribs or fins 78, 80, 82 that project from the footrest members 64 also may engage or be inserted into the ground or earth to further prevent lateral, rotational, and pivotal movement of the pole system 10.

In many instances, the pole system 10 will be inserted into the ground or soil that is below the surface 120 of a body of water, as shown in FIG. 7. In such situations, the adjustable length of the pole system 10 allows the head piece 16 to be positioned well above the surface 120 of the water. As shown, the hook assembly 98 allows articles 122 to be hung or supported on the pole system at a position above the surface 120 of the water.

As described previously, the head piece 16 may constitute a variety of different devices. These may include an article attachment device, a hook assembly, a hook, a carabiner, a support surface, a container, a box, a platform, a light, an LED light, a saw, a fishing rod holder, a decoy mount, a camera mount, a firearm holder, a firearm yoke, a magnet, etc. Several head pieces may be provided with the system 10 that are interchangeable. Thus, the hook assembly 98 may be replaced, for example, with any one of a carabiner, a support surface, a container, a box, a platform, a light, an LED light, a saw, a fishing rod holder, a decoy mount, a camera mount, a firearm holder, a firearm yoke, a magnet, etc., to be used for whatever job or task that is intended.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and, in a manner, consistent with the scope of the invention.

We claim:

1. A support pole system for supporting articles above the ground or earth, the support pole comprising:
   a support pole formed from at least two elongated pole sections that are telescoping pole sections that are movably coupled together with at least a portion of one elongated pole section being received within the other so that the pole sections can be telescopically moved longitudinally relative to one another between collapsed and extended positions to shorten and lengthen the support pole, the support pole having a longitudinal axis, the support pole having at least one of A and B, wherein:
   A) is the at least two elongated pole sections have a combination of releasable locking mechanisms to hold the at least two elongated pole sections in place relative to one another, the combination of locking mechanisms comprising 1) an apertured locking mechanism wherein an aperture is formed in a wall of at least one of the at least two elongated pole sections that engages a releasable locking structure of the other of the at least two elongated pole sections, with the locking structure being received within the aperture, and 2) a non-apertured frictional locking mechanism that is separate from the apertured locking mechanism; and
   B) is the at least two elongated pole sections have cooperating alignment members that engage one another to facilitate aligning the at least two elongated pole sections in a selected rotational position to prevent rotation of the at least two elongated pole sections relative to one another as the pole sections are telescopically moved longitudinally between the collapsed and extended positions;
   an article head piece coupled to an upper end of the support pole for attaching articles to the support pole; and
   a base assembly coupled to the lower end of the support pole, the base assembly comprising:
   a stake configured for insertion into the ground or earth for supporting the support pole in an upright position, the stake having projecting members that engage the ground or earth when the stake is inserted therein to prevent rotation of the stake about the longitudinal axis of the stake; and
   a cross member positioned at an upper end of the stake, the cross member forming a footrest to facilitate insertion of the stake into the ground or earth; and wherein
   the support pole further having at least one of C and D, wherein:
   C) is the stake and cross member are releasably coupled together, the stake and cross member having either a cooperating neck or a collar for coupling one to the other, the collar having an interior opening for receiving the neck of the other, the collar and neck having cooperating alignment members that engage one another to facilitate aligning the collar and neck in a selected position relative to one another as the neck is received in the collar; and further comprising a locking device to lock the neck and collar to lock the stake and cross member in place relative to one another; and D) is at least one of the stake and cross member has a central collar for receiving the lower end of a lower elongated pole section of one of the at least two elongated pole sections, the lower end of the lower elongated pole section and the central collar each having cooperating alignment members that engage one another to facilitate aligning the lower elongated pole section and the central collar in a selected position relative to one another as the lower end of the lower elongated pole section is received in the central collar; and further comprising a locking device to lock the lower end of the lower elongated pole section within the central collar.

2. The support pole system of claim 1, wherein: there is a single aperture formed in the wall of the of the at least one of the at least two elongated pole sections that is engaged by the releasable locking structure of the other when the at least two pole sections are in a selected position.

3. The support pole system of claim 1, wherein: the support pole has A.

4. The support pole system of claim 1, wherein: the support pole has B.

5. The support pole system of claim 1, wherein: the cross member is configured as a foot plate with an upper surface that has a width along all or a portion of the foot plate of from at least one inch or more for resting one's foot during insertion of the stake into the ground or earth, the cross member further having at least one lower projecting member that engages the ground or earth to prevent rotation of the cross member about the longitudinal axis of at least one of the support pole and stake.

6. The support pole system of claim 5, wherein: the at least one lower projecting member defines one or more recesses under the foot plate for receiving earth or soil when the base assembly is inserted into the ground or earth.

7. The support pole system of claim 6, wherein: foot plate has a footprint area of from 12 in$^2$ to 40 in$^2$ to prevent of sinking of the support pole system in soft ground or earth.

8. The support pole system of claim 1, wherein: the stake has a length of from 10 inches to 18 inches.

9. The support pole system of claim 1, wherein: the at least two elongated pole sections are movable between the collapsed and extended positions to shorten and lengthen the support pole to a selected length ranging from 2 feet to 10 feet.

10. The support pole system of claim 1, wherein: the article head piece includes a hook assembly with at least one hook that projects outward from the longitudinal axis of the support pole.

11. The support pole system of claim 10, wherein: the at least one hook has a planar upper surface.

12. The support pole system of claim 11, wherein: the planar upper surface of the at least one hook is at an angle of from 20° to 75° with respect to the longitudinal axis of the support pole.

13. The support pole system of claim 1, wherein: the article head piece includes at least one of an article attachment device, a hook assembly, a hook, a carabiner, a support surface, a container, a box, a platform, a light, an LED light, a saw, a fishing rod holder, a decoy mount, a camera mount, a firearm yoke, and a magnet.

14. The support pole system of claim 1, wherein: the support pole has C.

15. The support pole system of claim 1, wherein: the support pole has D.

16. The support pole system of claim 1, wherein: the apertured locking mechanism is at least one of a detent locking mechanism, a push-button locking mechanism, and a set screw locking mechanism; and wherein the non-apertured frictional locking mechanism is at least one of a split-collar lock locking mechanism, a twist lock clamp locking mechanism, an internal twist lock with an internal expander locking mechanism, a cam lock locking mechanism, an internal cam lock locking mechanism, a lever clamp locking mechanism, a set screw locking mechanism, and a clutch lock locking mechanism.

17. The support pole system of claim 1, wherein: there are at least three elongated pole sections.

18. A support pole system for supporting articles above the ground or earth, the support pole comprising:
a support pole formed from at least two elongated pole sections that are telescoping pole sections that are movably coupled together with at least a portion of one elongated pole section being received within the other so that the pole sections can be telescopically moved longitudinally relative to one another between collapsed and extended positions to shorten and lengthen the support pole, the support pole having a longitudinal axis, the support pole having A and B, wherein:
A) is the at least two elongated pole sections have a combination of releasable locking mechanisms to hold the at least two elongated pole sections in place relative to one another, the combination of locking mechanisms comprising 1) an apertured locking mechanism wherein an aperture is formed in a wall of the of at least one of the at least two elongated pole sections that engages a releasable locking structure of the other of the at least two elongated pole sections, with the locking structure being received within the aperture, and 2) a non-apertured frictional locking mechanism that is separate from the apertured locking mechanism; and
B) is the at least two elongated pole sections have cooperating alignment members that engage one another to facilitate aligning the at least two elongated pole sections in a selected rotational position to prevent rotation of the at least two elongated pole sections relative to one another as the pole sections are telescopically moved longitudinally between the collapsed and extended positions;
an article head piece coupled to an upper end of the support pole for attaching articles to the support pole; and
a base assembly coupled to the lower end of the support pole, the base assembly comprising:
a stake configured for insertion into the ground or earth for supporting the support pole in an upright position, the stake having projecting members that engage the ground or earth when the stake is inserted therein to prevent rotation of the stake about the longitudinal axis of the stake; and a cross member positioned at an upper end of the stake, the cross member forming a footrest to facilitate insertion of the stake into the ground or earth; and wherein the support pole further having at least one of C and D, wherein:

C) is the stake and cross member are releasably coupled together, the stake and cross member having either a cooperating neck or a collar for coupling one to the other, the collar having an interior opening for receiving the neck of the other, the collar and neck having cooperating alignment members that engage one another to facilitate aligning the collar and neck in a selected position relative to one another as the neck is received in the collar; and further comprising a locking device to lock the neck and collar to lock the stake and cross member in place relative to one another; and D) is at least one of the stake and cross member has a central collar for receiving the lower end of a lower elongated pole section of one of the at least two elongated pole sections, the lower end of the lower elongated pole section and the central collar each having cooperating alignment members that engage one another to facilitate aligning the lower elongated pole section and the central collar in a selected position relative to one another as the lower end of the lower elongated pole section is received in the central collar; and further comprising a locking device to lock the lower end of the lower elongated pole section within the central collar.

19. The support pole system of claim 18, wherein:

the cross member is configured as a foot plate with an upper surface that has a width along all or a portion of the foot plate of from at least one inch or more for resting one's foot during insertion of the stake into the ground or earth, the cross member further having at least one lower projecting member that engages the ground or earth to prevent rotation of the cross member about the longitudinal axis of at least one of the support pole and stake, the at least one lower projecting member forming one or more recesses under the foot plate for receiving earth or soil when the base assembly is inserted into the ground or earth.

20. The support pole system of claim 18, wherein:

there is a single aperture formed in the wall of the of the at least one of the at least two elongated pole sections that is engaged by the releasable locking structure of the other when the at least two pole sections are in a selected position.

* * * * *